(12) United States Patent
Steffensmeier

(10) Patent No.: US 6,457,837 B1
(45) Date of Patent: Oct. 1, 2002

(54) HIGH RELIABILITY LIGHTING SYSTEM

(75) Inventor: Martin J. Steffensmeier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 56 days.

(21) Appl. No.: 09/771,419

(22) Filed: Jan. 26, 2001

(51) Int. Cl.⁷ ............................................. F21V 13/12
(52) U.S. Cl. ........................ 362/19; 362/241; 362/264
(58) Field of Search .......................... 362/19, 235, 241, 362/264

(56) References Cited

U.S. PATENT DOCUMENTS 6,196,699 B1 * 3/2001 Stanton ...................... 362/235

* cited by examiner

*Primary Examiner*—Sandra O'Shea
*Assistant Examiner*—Margobind S. Sawhney
(74) *Attorney, Agent, or Firm*—Nathan O. Jensen; Kyle Eppele

(57) ABSTRACT

A lighting system is disclosed. The lighting system includes a first selectively actuated light module that emits light having a first polarization orientation. A second selectively actuated light module emits light having a second polarization orientation that is orthogonal to the first polarization orientation. A first combining element combines and directs light from the first and second light modules into an optical path. A first polarization alignment element aligns the polarization of light from the first combining element to a predetermined polarization orientation. The first and second light modules are selectively actuated to ensure that light having the predetermined polarization orientation is substantially constantly emitted when desired.

18 Claims, 2 Drawing Sheets

HIGH RELIABILITY LIGHTING SYSTEM

FIELD OF THE INVENTION

The invention relates to displays, and more particularly, to a high-reliability lighting system that provides light to a display.

BACKGROUND OF THE INVENTION

A common type of visual display includes a light source, such as an arc lamp, that is modulated to provide a readable output for a user. Displays used in applications such as avionics must be designed to operate even if the light source fails. Consequently, high-reliability displays have a back-up light source that is actuated if something is wrong with the principal lighting source. Because of space considerations such a back-up light source may have a smaller, lesser-intensity bulb. Alternately, the back-up light source may light only part of the display, which may cause a reduction in quality of the readable output.

Another issue relating to displays is that some types of displays require an output to have a specific polarization state or direction. As is known in the art, polarized light may be defined as being in one of two orthogonal polarization states or orientations, known as the p and s polarization states, that are both orthogonal to the direction of transmission of light. A display may require light to be in either the p or the s polarization state. It is difficult to properly maintain the desired polarization direction in a lighting system with multiple light sources, especially when the light sources can be actuated in any one of several combinations.

It is therefore an object of the invention to provide a lighting system that may be operated in a high-reliability environment.

It is another object of the invention to provide a high-reliability lighting system that maintains a consistent output even in the event of failure.

It is still another object of the invention to provide a high-reliability lighting system that provides light with a consistent polarization state regardless of the combination of light sources that are actuated therein.

A feature of the invention is the use of optically reflective and transmissive elements that combine the polarized light from a plurality of lamps so that the polarization state of the light so produced may be modified as desired.

An advantage of the invention is that a compact, high-reliability source of polarized light is ensured.

SUMMARY OF THE INVENTION

The invention provides a lighting system that includes a first selectively actuated light module that emits light having a first polarization orientation. A second selectively actuated light module emits light having a second polarization orientation that is orthogonal to the first polarization orientation. A first combining element combines and directs light from the first and second light modules into an optical path. A first polarization alignment element aligns the polarization of light from the first combining element to a predetermined polarization orientation. The first and second light modules are selectively actuated to ensure that light having the predetermined polarization orientation is substantially constantly emitted when desired.

The invention also provides a lighting system including a first selectively actuated light module that emits light having a first polarization orientation. A second selectively actuated light module emits light having a second polarization orientation that is orthogonal to the first polarization orientation. A third selectively actuated light module emits light having the first polarization orientation. A first combining element combines and directs light from the first and second light modules into a first optical path. A first polarization alignment element aligns the polarization of light from the first combining element to a first predetermined polarization orientation. A second combining element combines light from the third light module with light from the first and second light modules. A second polarization alignment element aligns the polarization of light from the second combining element to a second predetermined polarization orientation. The first, second and third light modules are selectively actuated to ensure that light having the second predetermined polarization orientation is substantially constantly emitted when desired.

The invention further provides a method of providing a source of light. According to the method, light from a first light module with a first polarization orientation is selectively provided. Light from a second light module with a second polarization orientation that is orthogonal to the first polarization orientation is selectively provided. Light from the first and second light modules are combined and directed into an optical path. The polarization of light in the optical path is aligned to a predetermined polarization orientation. Light from the first and second light modules is selectively emitted to ensure that light having the predetermined polarization is substantially constantly emitted when desired.

DETAILED DESCRIPTION OF THE DRAWINGS

Figure 1:
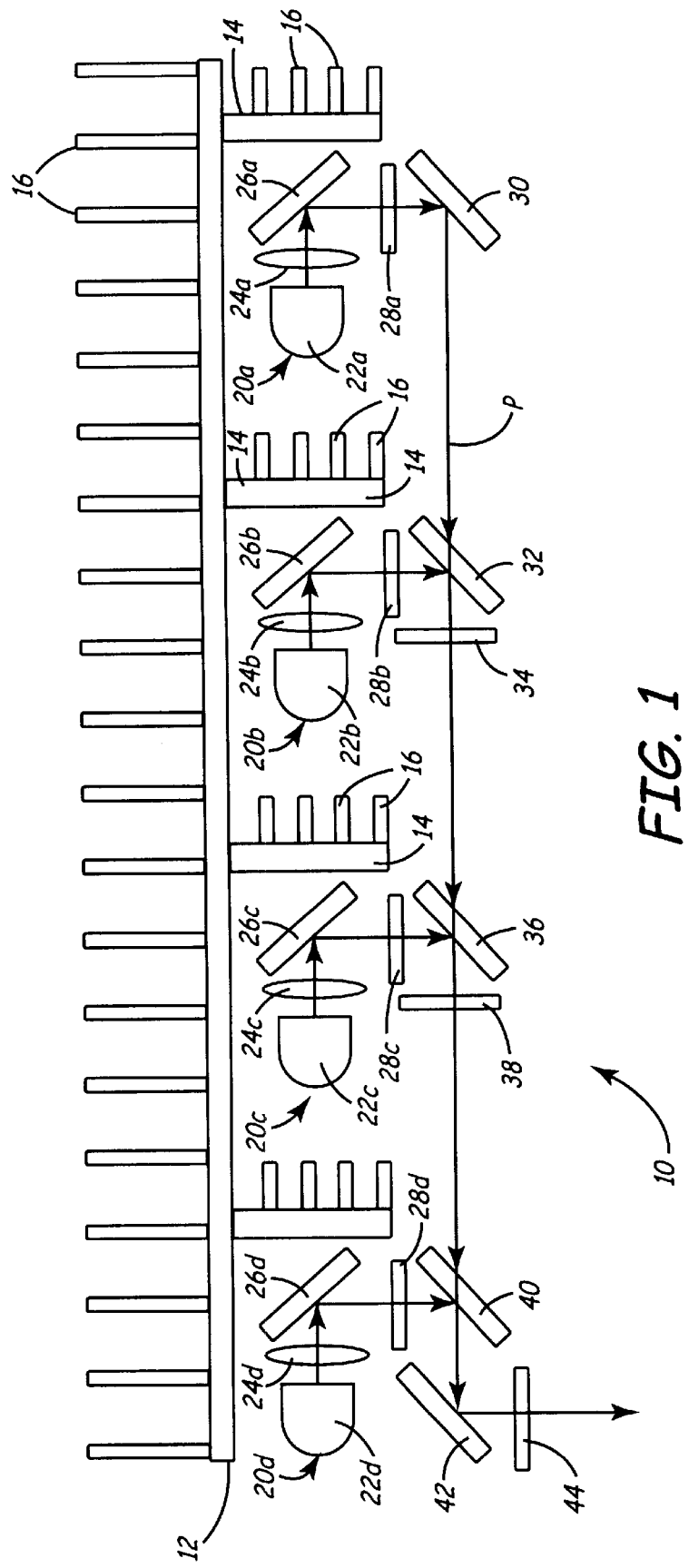
FIG. 1 is a schematic diagram of a lighting system according to one embodiment of the invention.

FIG. 1 shows a lighting system 10 according to one embodiment of the invention, which may serve as an illumination source for a display. Lighting system 10 includes a heat dissipation structure, which is depicted as a heat sink 12. Heat sink 12 includes a plurality of extensions 14 and fins 16 to dissipate heat created by the remainder of the lighting system that is described below.

Lighting system 10 comprises a first lamp module 20a. First lamp module 20a includes an arc-type lamp 22a, which may be a xenon arc lamp. A focusing element such as a lens 24a is positioned to focus light emitted from the first lamp module. A filtering element, shown as a cold mirror 26a, reflects visible wavelengths of light and transmits wavelengths of light from the unseen spectrum, such as ultraviolet (UV) and infrared (IR) light. As the heat from UV and IR light may warp or damage the sensitive optical components of the lighting system, cold mirror 26a therefore removes UV and IR light from the light to be output by the light module. Heat sink 12 dissipates the heat from wavelengths transmitted by cold mirror 26a.

Light reflected by cold mirror 26a passes through a first polarization alignment element, which is preferably a first polarization recovery film 28a. First polarization recovery film 28a is positioned to transmit light in a first polarization state, while rotating the polarization of light in a second, orthogonal polarization state to the first state. Light exiting first lamp module 20a is therefore substantially completely aligned in the first polarization state. The light from the first lamp module is reflected by a mirror 30 so that it is in a principal optical path P.

Lighting system 10 further comprises a second lamp module 20b, a third lamp module 20c, and a fourth lamp module 20d. Each of the second, third and fourth lamp modules include an arc lamp 22b, 22c, 22d, a lens 24b, 24c, 24d, and a cold mirror 26b, 26c, 26d. These components are substantially identical to the similarly numbered components in the first lamp module. Second, third and fourth lamp modules 20b, 20c, 20d further include a second, third and fourth polarization recovery film 28b, 28c, 28d, respectively. Each of the second, third and fourth polarization recovery films transmit light in the second polarization state and rotate the polarization of light in the first state to be in the second state. Note that the effect of second, third and fourth polarization recovery films 28b, 28c, 28d is opposite of the effect of first polarization recovery film 28a.

Light from second lamp module 20b is directed toward a first combining element, which is depicted as a first polarizing beam splitter 32. First polarizing beam splitter 32 transmits light in the first state and reflects light in the second state. Therefore, as first polarizing beam splitter 32 is situated in the principal optical path, light from the first lamp module, which is in the first state, passes through the first polarizing beam splitter. Furthermore, light from the second lamp module, which is in the second state, is reflected by the first polarizing beam splitter into the principal optical path, thereby combining with light from the first lamp module.

After passing through or being reflected by the first polarizing beam splitter, the principal optical path includes light in both the first and second polarization states. Light from the first polarizing beam splitter passes through a fifth polarization recovery film 34, which like first polarization recovery film 28a transmits light in the first state while rotating the polarization of light in the second state to the first state. The light is therefore substantially completely oriented in the first state. A second polarizing beam splitter 36 is situated to reflect light from third lamp module 20c (which is in the second polarization state) into the principal optical path and to transmit light from the combined first and second lamp modules, which at this point has been aligned to the first state. The light so combined is in the first and second states. A sixth polarization recovery film 38 transmits light in the first state and rotates light in the second state to the first state. A third polarizing beam splitter 40 is situated to reflect light from fourth lamp module 20c (which is in the second polarization state) into the principal optical path and to transmit light from the combined first, second and third lamp modules, which at this point has been aligned to the first state. The light so combined is in the first state and the second state. Light in the principal optical path is then reflected by a mirror 42 and passes through a seventh polarization recovery film 44. The polarization transmission characteristics of the seventh recovery film are determined by the desired application. For instance, if light in the first polarization state is required to be output to a display, seventh polarization recovery film 44 is selected to transmit light in the first state and to rotate light in the second state to the first state. On the other hand, if light in the second state is required to be output to a display, the seventh polarization recovery film is rotated so that it transmits light in the second state and rotates light in the first state to the second state. Regardless of the characteristics of the seventh polarization recovery film, light exiting the seventh polarization recovery film is substantially completely in a single polarization state (either the first state or the second state) and is ready to function as an illumination source for a display, such as an avionics display.

It can be seen that any combination of first through fourth lamp modules 20a–d may be activated at any time while maintaining the polarization state of the light exiting the light system. Because of this characteristic, light system 10 has particular utility as a high-reliability or failsafe illumination source. For example, a normal operating mode may be defined as having first and second arc lamps 22a, 22b turned on and third and fourth arc lamps 22c, 22d turned off. If one of the first or second arc lamps fails, one of the third or fourth arc lamps may be turned on to compensate for the failure. In such a situation there is no reduction in light output. A control system (not shown) may be employed to detect the failure of an arc lamp and to actuate another of the arc lamp in its place. As one skilled in the art could design and construct a suitable control system without undue experimentation, the control system will not be further described.

The polarization recovery films disclosed herein are preferably made of sheets of transparent plastic so that light may pass therethrough. Polarization recovery film manufactured by Polatechno of Nakakubiki-Gun, Niigata-Ken, Japan should provide satisfactory results. The polarizing beam splitters disclosed herein preferably comprise a coating disposed on a transparent sheet of glass or plastic. A beam splitter sold under the trade name HELF™ and manufactured by Balzers Thin Films of Balzers, Lichtenstein should provide satisfactory results.

Figure 2:
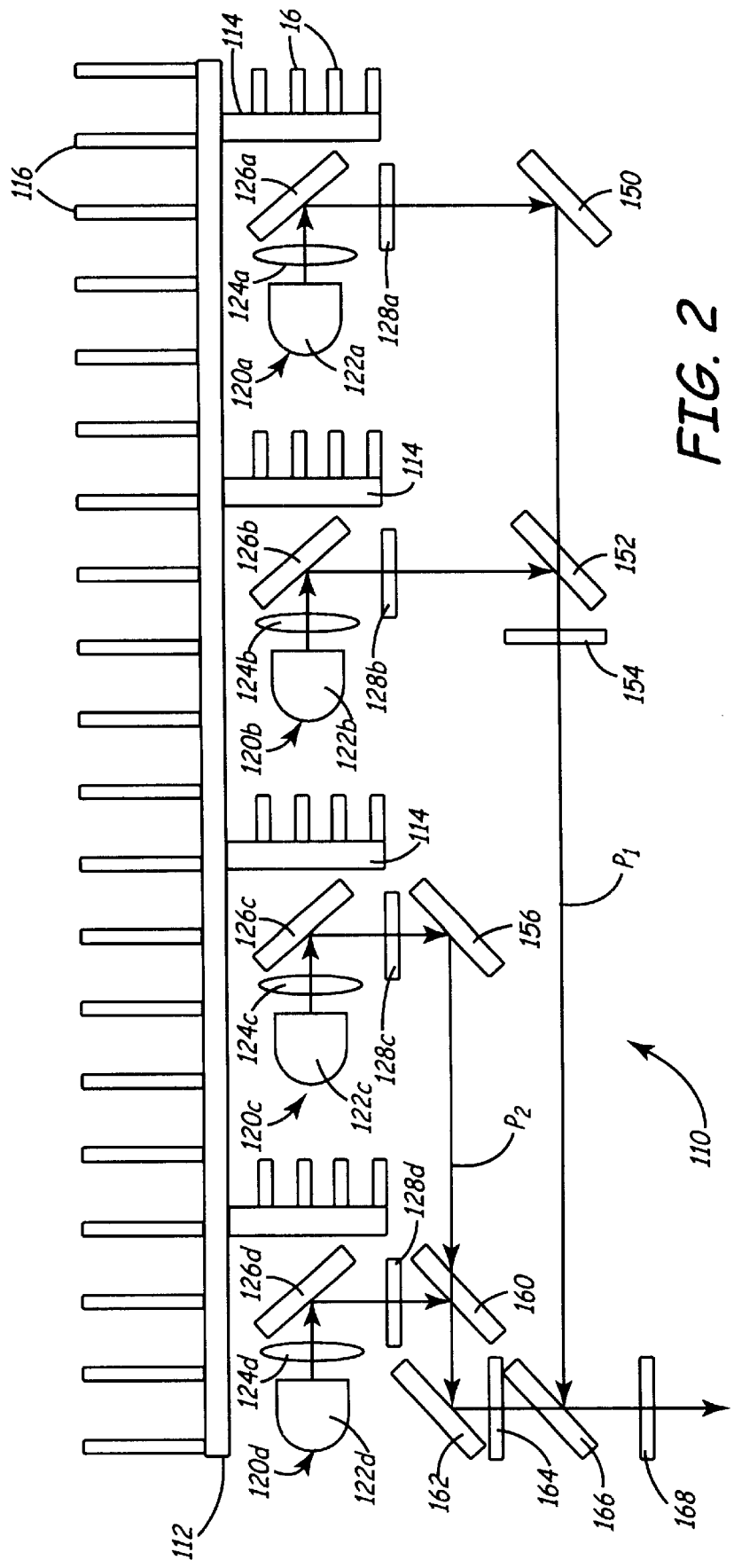
FIG. 2 is a schematic diagram of a lighting system according to another embodiment of the invention.

FIG. 2 depicts a lighting system 110 according to another embodiment of the invention. Components of lighting system 110 that are similar to components of lighting system 10 will be identified by similar reference numbers with the addition of the prefix "1." Due to the different ways the embodiments combine these components, however, ordinal identifiers (e.g., first, second, third, etc.) may differ between the embodiments. Lighting system has a heat sink 112 that includes extensions 114 and fins 116. Each of first through fourth lamp modules 120a–d includes an arc lamp 122a–d, a lens 124a–d, a cold mirror 126a–d, and first through fourth polarization recovery films 128a–d, respectively. First and third polarization recovery films 128a, 128c transmit light in the first polarization state and rotate light in the second polarization state to the first state. Second and fourth polarization recovery films 128b, 128d transmit light in the second state and rotate light in the first state to the second state. Heat sink 112 is disposed near arc lamps 122a–d and cold mirrors 126a–d to absorb and dissipate heat produced by those components.

Light exiting the first lamp module, in the first state, is reflected by a mirror 150 and directed into a first optical path $P_1$. First polarizing beam splitter 152 is situated at the intersection of the first optical path and the path of light emitted from second lamp module 120b, which is in the second state. First polarizing beam splitter 152 transmits light in the first state and reflects light in the second state, thereby combining the light from the first and second lamp modules. A fifth polarization recovery film 154 is placed in the first optical path to transmit light in the second state and rotate light in the first state to the second state.

Light exiting third lamp module 120c, in the first state, is reflected by a mirror 156 and directed into a second optical path $P_2$. A second polarizing beam splitter 160 is positioned at the intersection of the second optical path and the path of light emitted from fourth lamp module 120d, which is in the second state.

Second polarizing beam splitter 160 transmits light in the first state and reflects light in the second state, thereby combining the light from the third and fourth lamp modules. A mirror 162 directs light in second optical path P$_2$ toward first optical path P$_1$. The light passes through a sixth polarization recovery film 164, which transmits light in the first state and rotates light in the second state to the s state. A third polarizing beam splitter 166 is positioned at the intersection of first and second optical paths P$_1$, P$_2$. Third polarizing beam splitter 166 transmits light from the second optical path, which is in the first state, and reflects light from the first optical path, which is in the second state. Light from the first optical path P$_1$ is thereby combined with light from second optical path P$_2$.

Finally, the combined light passes through a seventh polarization recovery film 168. The polarization transmission characteristics of the seventh recovery film are determined by the desired application. For instance, if light in the first polarization state is desired, seventh polarization recovery film 168 is aligned to transmit light in the first state and to rotate light in the second state to the first state. On the other hand, if light in the second state is desired, the seventh polarization recovery film is rotated to transmit light in the second state and rotate light in the first state to the second state. Regardless of the characteristics of the eighth polarization recovery film, light exiting the eighth polarization recovery film is substantially completely in a single polarization state (either the first state or the second state) and is ready to function as an illumination source for a display, such as an avionics display.

Although lighting system 10 (FIG. 1) provides an effective and efficient method of combining light from multiple sources, there are some losses in light intensity that occur when light passes through polarizing beam splitters 32, 36, 40. Furthermore, such losses are not uniform between lamp modules because light from each lamp module may be required to contact a different number of polarizing beam splitters. For instance, light from first and second lamp modules 20a, 20b contact first, second and third polarizing beam splitters 32, 36, 40, while light from fourth lamp module 20d contacts only third polarizing beam splitter 40.

Lighting system 110 (FIG. 2) minimizes the average number of polarizing beam splitters that light from each lamp module 120a–d must contact. Furthermore, lighting system 110 ensures that light from each lamp module 120a–d contacts the same number of polarizing beam splitters as the other lamp modules.

The embodiments as disclosed have specified which polarization recovery films are to transmit light in the first state and which films are to transmit light in the second state. The first and second polarization states may correspond to the common conventions of the p and s polarization states, respectively. However, the first and second polarization states, which may be thought of as polarization orientations, may be chosen to correspond to the s and p polarization states, respectively, although such a reversal may require a rearrangement of some of the components.

The invention may be varied in other ways while keeping with the spirit of the invention. The lamp modules have been described as using arc lamps, and preferably xenon arc lamps, but other types of light sources may be used, such as halogen or sulfur arc-type lamps, or even incandescent lamps. A laser light source may also be used, but other components may need to be included in the light system design if a laser light source is used. A plurality of lenses/optical elements may be used to focus light within the lamp modules. Also, lenses or other focusing elements may be positioned within the optical path to maintain the light within the optical path. The precise positions of the polarization recovery films may be varied as long as the desired polarization states are preserved.

An advantage of the invention is that a plurality of light sources may be combined into a minimum number of light paths.

Another advantage is that a plurality of light sources may be combined to provide a compact high-reliability lighting system.

Still another advantage is that the invention requires a relatively small number of different types of parts. This keeps inventory costs low.

Yet another advantage is that light from any desired combination of light sources may be combined using inexpensive mirrors and polarization components.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A lighting system, comprising:
   a first selectively actuated light module that emits light having a first polarization orientation;
   a second selectively actuated light module that emits light having a second polarization orientation that is orthogonal to the first polarization orientation;
   a first combining element that combines and directs light from the first and second light modules into an optical path; and
   a first polarization alignment element that aligns the polarization of light from the first combining element to a predetermined polarization orientation;
   wherein the first and second light modules are selectively actuated to ensure that light having the predetermined polarization orientation is substantially constantly emitted when desired.

2. The lighting system of claim 1, wherein the first light module includes a light source and a focusing element that focuses light emitted by the light source.

3. The lighting system of claim 2, wherein the first light module further includes a filtering element that prevents predetermined wavelengths of light from being emitted by the first light module.

4. The lighting system of claim 3, wherein the filtering element removes substantially all non-visible wavelengths of light from the light emitted by the first light module.

5. The lighting system of claim 2, wherein the focusing element includes at least one lens.

6. The lighting system of claim 2, wherein the light source is an arc lamp.

7. The lighting system of claim 1, wherein the first light module further includes a second polarization alignment element that aligns the polarization of light emitted therefrom to have the first polarization orientation.

8. The lighting system of claim 7, wherein the second light module further includes a third polarization alignment element that aligns the polarization of light emitted therefrom to have the second polarization orientation.

9. The lighting system of claim 1, further including:
a third selectively actuated light module that emits light having one of the first and second polarization orientations; and
a second combining element that combines light from the third light module with light from the first and second modules;
wherein the first, second and third light modules are selectively actuated to ensure that light having the predetermined polarization orientation is substantially constantly emitted when desired.

10. The lighting system of claim 1, further including a heat dissipation apparatus that at least partially surrounds the first and second light modules to remove undesired heat from the lighting system.

11. A lighting system comprising:
a first selectively actuated light module that emits light having a first polarization orientation;
a second selectively actuated light module that emits light having a second polarization orientation that is orthogonal to the first polarization orientation;
a third selectively actuated light module that emits light having the second polarization orientation;
a first combining element that combines and directs light from the first and second light modules into a first optical path;
a first polarization alignment element that aligns the polarization of light from the first combining element to a first predetermined polarization orientation;
a second combining element that combines light from the third light module with light from the first and second light modules; and
a second polarization alignment element that aligns the polarization of light from the second combining element to a second predetermined polarization orientation;
wherein the first, second and third light modules are selectively actuated to ensure that light having the second predetermined polarization orientation is substantially constantly emitted when desired.

12. The lighting system of claim 11, further including a reflective element that directs light from the third light module along a second optical path, wherein the second combining element combine s light from the first and second optical paths.

13. The lighting system of claim 12, fu her including:
a fourth selectively actuated light module that emits light having the second polarization orientation; and
a third combining element that combines and directs light from the third and fourth lamp modules into the second optical path.

14. The lighting system of claim 11, fu her including:
a fourth selectively actuated light module that emits light having the second polarization orientation; and
a third combining element that combines light from the fourth light module with light from the first, second and third modules in the first optical path.

15. The lighting system of claim 11, wherein each of the light modules includes a polarization alignment element that aligns the polarization of light emitted therefrom to have one of the first and second polarization orientations.

16. The lighting system of claim 11 wherein the first light module further includes a filtering element that prevents substantially all non-visible wavelengths of light from being emitted by the first light module.

17. A method of providing a source of light, comprising:
selectively providing light from a first light module with a first polarization orientation;
selectively providing light from a second light module with a second polarization orientation that is orthogonal to the first polarization orientation;
combining and directing the light from the first and second light modules into an optical path;
aligning the polarization of light in the optical path to a predetermined polarization orientation; and
selectively emitting light from the first and second light modules to ensure that light having the predetermined polarization is substantially constantly emitted when desired.

18. The method of claim 17, further including filtering non-visible wavelengths of light from the first and second light modules.

* * * * *